Figure 2:
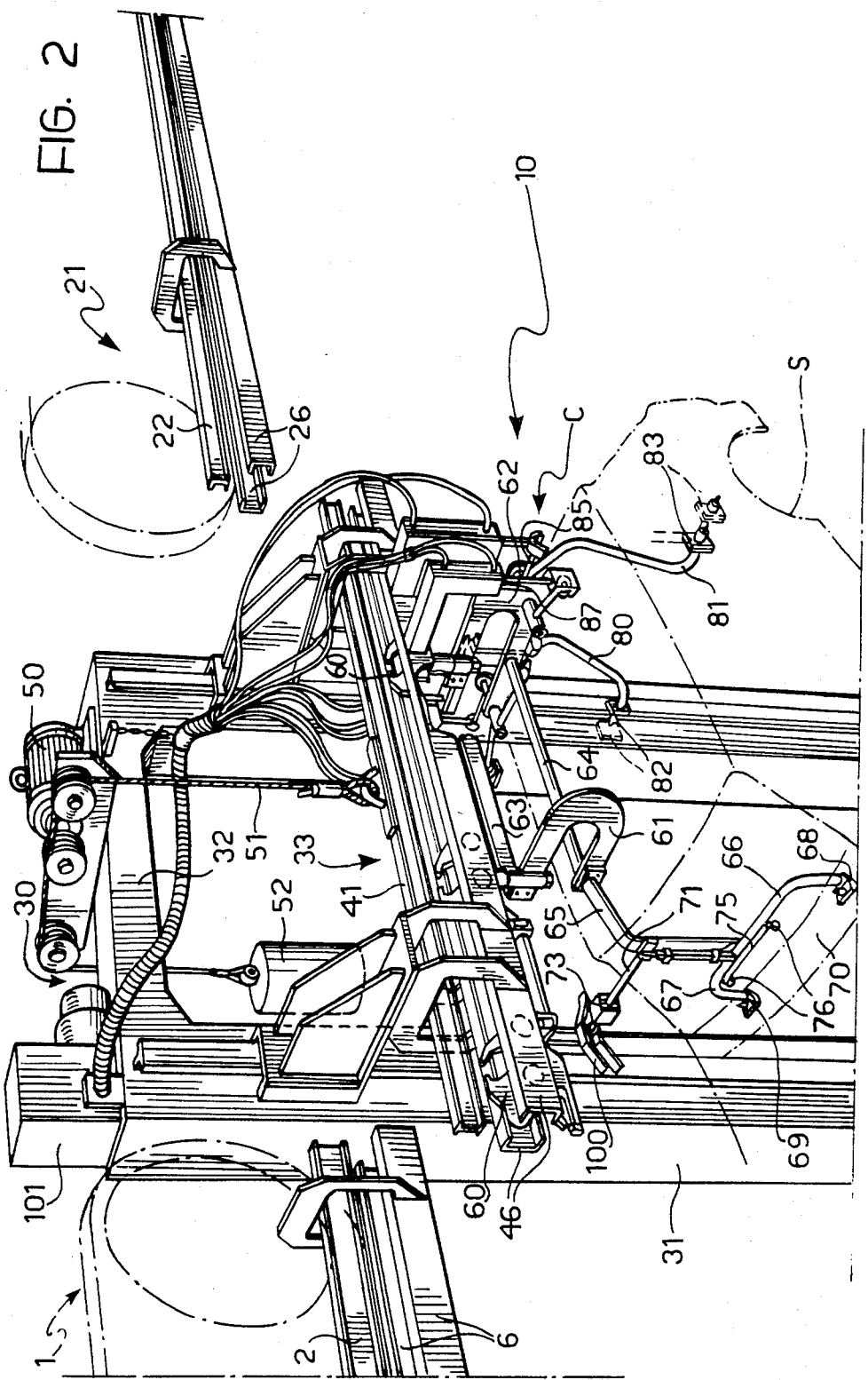

United States Patent [19]

Boccalatte

[11] Patent Number: 4,512,869
[45] Date of Patent: Apr. 23, 1985

[54] OVERHEAD CONVEYOR INSTALLATION FOR MOTOR VEHICLE BODIES PARTICULARLY FOR ELECTROPHORESIS PAINT LINES, AND A BODY CARRIER USABLE IN THIS INSTALLATION

[75] Inventor: Vitale Boccalatte, Turin, Italy
[73] Assignee: Fiat Auto S.p.A., Turin, Italy
[21] Appl. No.: 610,411
[22] Filed: May 15, 1984
[30] Foreign Application Priority Data
  May 19, 1983 [IT] Italy .................... 67556 A/83
[51] Int. Cl.³ .............. B65G 49/02; C25D 13/04; C25D 13/12
[52] U.S. Cl. ................ 204/300 EC; 204/299 EC
[58] Field of Search .............. 204/300 EC, 299 EC
[56] References Cited

U.S. PATENT DOCUMENTS 4,210,505  7/1980  Todoroki et al. ............ 204/300 EC

FOREIGN PATENT DOCUMENTS 45-23237  8/1970  Japan ..................... 204/300 EC Primary Examiner—Howard S. Williams
Attorney, Agent, or Firm—Cushman, Darby & Cushman

[57] ABSTRACT

An overhead conveyor installation for motor-vehicle bodies is provided which is particularly suited for use in electrophoresic paint lines. The installation includes a loading station whereat body carriers conveyed by conveyors of the installation are loaded up with respective vehicle bodies supplied to the loading station by robot trucks. Each body carrier comprises front and rear dependent arms arranged to be introduced through the wind-shield and rear window openings of a vehicle body and engaged with internal apertures preformed in the body. Each body carrier also comprises an electrical contact member enabling connection of a body loaded onto the carrier to a voltage source, and a locking arrangement for locking the arms and contact member in their positions of engagement with a motor-vehicle body. The loading station includes a vertically movable structure for lowering the body carrier down over a body to be picked up, and various actuators arranged to control engagement and locking of the body carrier arms.

7 Claims, 7 Drawing Figures

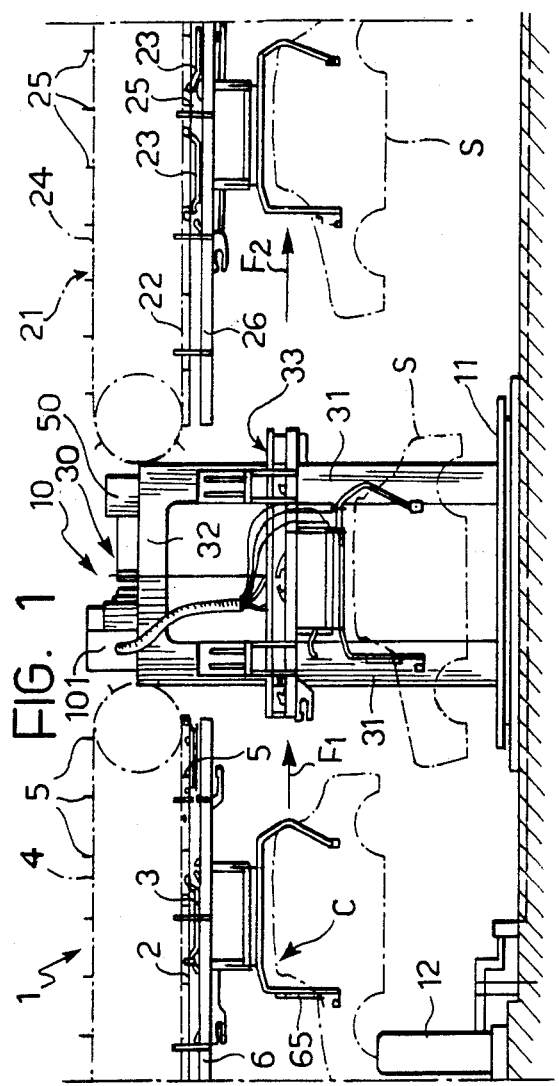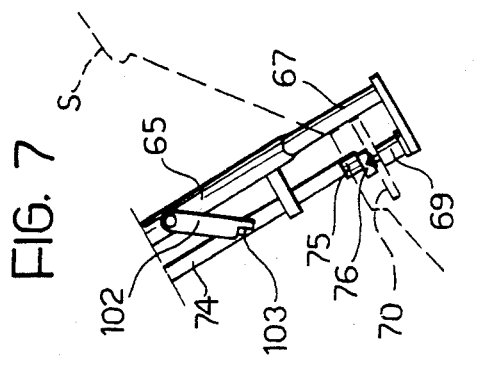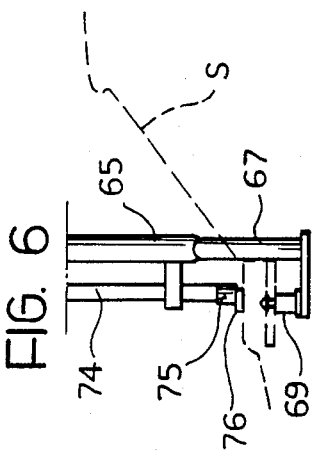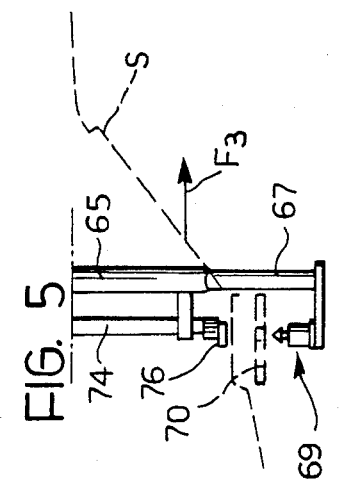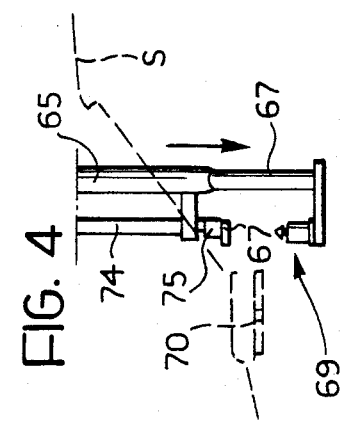

OVERHEAD CONVEYOR INSTALLATION FOR MOTOR VEHICLE BODIES PARTICULARLY FOR ELECTROPHORESIS PAINT LINES, AND A BODY CARRIER USABLE IN THIS INSTALLATION

The invention relates in particular to a body carrier for overhead conveyors of the bi-rail type, that is, of the kind comprising an upper rail, which, by the use of support trolleys, supports and guides a drive chain carrying pushers, a pair of lower rails along which load-bearing elements, (for example, body carriers) run on trolleys, entrained by the pushers of the above-mentioned chain.

An object of the invention is to provide a body carrier particularly for overhead conveyors of the said type, which will be simple and economical to manufacture and allow complete automatisation of the operations of loading and off-loading of the bodies.

According to the invention this object is achieved by a body carrier characterised in that it comprises, in combination, at least one trolley carrying a support structure arranged to receive and convey a body; the said structure having front suspension means and rear suspension means, for introduction into the body through the windscreen aperture and the rear window aperture respectively, and for engagement in apertures preformed in the body:

at least one electrical contact member carried by the said structure and connectible to the body to allow connection of the body to an electric voltage source, first locking means for simultaneously locking the front suspension means and the said electrical contact member respectively in an engaged position, and in a position of contact with the body; and second locking means for locking the rear suspension means in an engaged position in the body.

A further object of the invention is to provide an overhead conveyor installation for motor vehicle bodies, particularly for the electrophoresic paint lines for car bodies, having at least one first overhead conveyor arranged to supply in succession, body carriers to a loading station where bodies are to be loaded on to the said body carriers, a transport system for the bodies comprising a plurality of motorised tables or platforms or self-propelled trucks each arranged to transport one body to the loading station; the movements of the said tables or platforms or trucks being controlled by a central control unit; and a second overhead conveyor arranged to take up and set moving the successive body carriers loaded up at the loading station.

A further object of the invention is thus to provide an overhead conveyor installation of the said type which by the use of body carriers of the aforesaid kind, will allow complete automation of the loading (and off-loading) operations of the bodies carried on the body carriers.

This object is achieved, according to the invention by an installation the main characteristic of which is that the aforesaid loading station consists of a frame a guide and support structure mounted for vertical movement relative to the frame, between a raised position in which the said structure is able to receive a body carrier from the said first conveyor, and one or more lowered positions enabling the said suspension means of the body carrier to be introduced into and engaged with the body carried by a motorised platform, drive means mounted on the frame and arranged when operated, to effect vertical movement of the guide and support structure, positioning means, mounted on the said guide and support structure and arranged when activated, to locate and hold in a predetermined position relative to the guide and support structure, a body carrier carried by the said structure, control means arranged to de-activate the said first locking means when the said body carrier reaches said predetermined position, first and second oeprating means respectively arranged when a body carrier is in the said predetermined position, to enable the said rear suspension means to be introduced into and engaged with the body, and to effect locking of the said rear suspension means in an engaged position using the said second locking means, and an electronic control and command system connected to the central control unit of the robot transport system and arranged (a) to activate the said positioning means every time a body carrier arrives at the said guide and support structure, (b) thereafter to activate the said first operating means to allow the introduction of the said rear suspension means into the body, (c) to operate the drive means to lower the guide and support structure relative to the frame and introduce the front and rear suspension means of the body carrier into the body, (d) to supply command signals to the said central unit to cause movement by a predetermined amount of the motorised platform situated below the guide and support structure and of the body carried by it.

(e) to operate the said drive means to effect raising of the said guide and support structure and consequent engagement of the front suspension means with the body, (f) to effect, using the said first and second operating means, engagement of the rear suspension means with the body and locking of the said suspension means in its engaged position.

Figure 3:
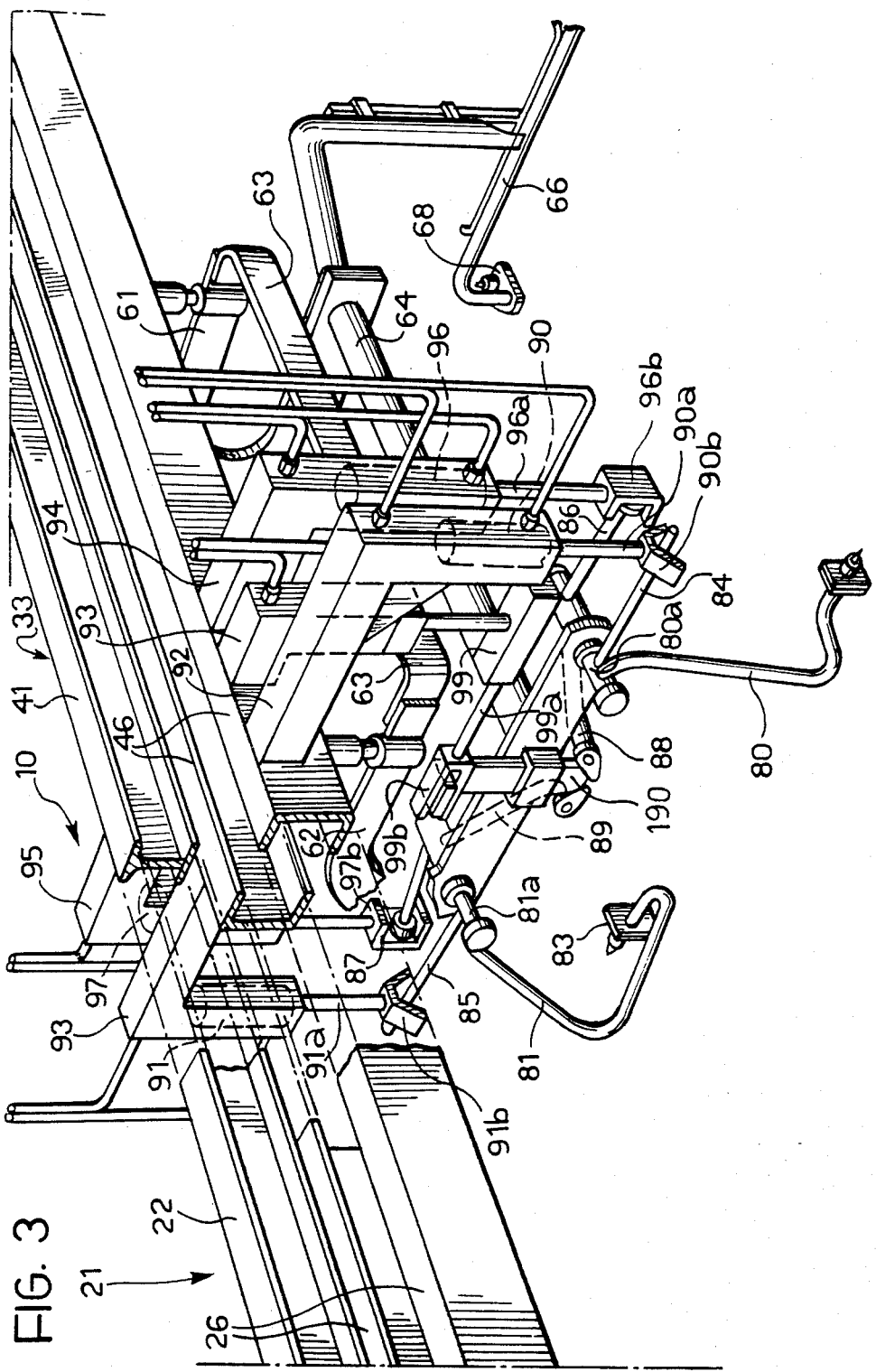

Further characteristics and advantages of the body carrier and of the conveyor installation according to the invention will emerge from the following detailed description given with reference to the accompanying drawings, supplied purely by way of non-limiting example in which:

FIG. 1 shows diagrammatically, in lateral view, one portion of an installation according to the invention, FIG. 2 is a perspective view of a loading station for loading a motor vehicle body on to a body carrier of the invention, FIG. 3 is a perspective view of one portion of the loading station of FIG. 2, FIGS. 4 to 7 show diagrammatically one portion of a body carrier according to the invention, in various successive positions.

FIG. 1 diagrammatically depicts one portion of an overhead conveyor installation of the invention for conveying motor-vehicle bodies. The installation comprises a first overhead conveyor of the bi-rail type, shown in its entirety as 1. The said conveyor comprises in a manner known per se, an upper rail 2 along which run trolleys 3, that support and guide a drive chain 4 provided with pushers 5.

Reference 6 indicates a pair of lower rails of the conveyor, which support and guide load-bearing elements, in particular, body carriers indicated in their entirety by C.

The said conveyors are of known kind and will not therefore be further described below.

The conveyor 1 is arranged to feed successively body carriers C in the direction indicated by arrow $F_1$ to a body-loading station indicated in its entirety by 10. At this station, a body S is loaded in a manner which will later be described in detail, on to a body carrier C moved up to this station by the conveyor 1.

The bodies S arrive at the loading station 10 via a transport system, with motorised platforms or tables of the kind known per se and consisting of a plurality of motorised platforms 11 (only one of which is shown in FIG. 1) the movements of which are controlled by a central control unit 12.

In FIG. 1 reference 21 indicates a second overhead conveyor substantially identical to the conveyor 1, which is arranged to remove from the loading station 10 the body carriers C that have been loaded up with respective bodies S at the said station. The said conveyor 21 therefore also comprises an upper rail 22 for guiding the trolleys 23 that support and guide a drive chain 24 fitted with pushers 25 (FIG. 1). This conveyor also comprises a pair of lower rails 26 to guide the body carriers C in the direction of arrow $F_2$, towards an electrophoresic paint station.

As can be seen in detail from FIGS. 1 and 2, the loading station 10 consists of a frame 30 substantially in the form of a portal, with two guide columns 31, connected at the top by a crosspiece 32.

Reference 33 indicates a guide and support structure comprising (FIG. 2) a length of upper rail 41 and two lengths of lower rail 46, having dimensions and relative positions corresponding to the dimensions and relative positions of the conveyor rails 1 and 21.

The guide and support structure 33 is movable vertically up and down the columns 31 of the portal 30 under the action of an electric drive motor 50 supported from above by the crosspiece 32. Movement of the structure 33 is controlled by a cable 51, and the weight of the said structure is counterbalanced by a counterweight 52.

A body carrier embodying the invention will now be described with particular reference to FIGS. 2 and 3.

In the example shown, a body carrier comprises a train of trolleys 60 (FIG. 2) running on the rails 6 of the conveyor 1, on the rails 46 of the guide structure 33 of the loading station or on the rails 26 of the conveyor 31.

Each trolley 60 is provided, in a manner known per se, with entrainment and retention pawls arranged to cooperate with the pusher members carried by the drive chains of the aforesaid conveyors.

In the embodiment shown in FIG. 2, the body carrier is provided with four trolleys 60. Connected to the two central tolleys are a front support element 61 and a rear support element 62, both C-shaped and lying in substantially parallel planes orthogonal to the longitudinal axis of the guide and support structure 33.

The upper ends of the two support elements 61, 62 are connected together by a bar 63 of electrically conductive material e.g. copper. The lower ends of the said support elements are interconnected by a connecting rod 64.

A tubular element 65 is connected to the lower end of the support element 61, on the side thereof opposite to the rod 64. The tubular element 65 is bent in the form of an inverted L, with its lower end dividing into two branches 66, 57 each of which terminates in an engagement member 68,69. As will be better described below, the said engagement members are designed to engage, with an upwards movement, a respective aperture formed in a cross member within the body, indicated by 70 in FIG. 2.

A first end of a lever 71 articulated to the vertical section of the tubular element 65, which the other end of this lever carries a weight 73. A rod 74 is connected to the lever 71 at a point intermediate the two ends of the lever, in proximity to its point of articulation. The rod 74 is movable axially parallel to the vertical section of the tubular element 65. A transverse rod 75 is connected to the lower end of the said rod 74 and carries at its ends a pair of electrical contacts (electrodes) indicated by reference 76. The said electrodes are electrically connected to the conductor bar 63. This bar is connectible to a voltage source by means of a sliding contact engaging an electrified guide, of a kind known per se and not illustrated, when the body carrier and the body carried thereby are immersed in a bath or tank of paint for electrophoresis.

When, under the effect of its own weight, the counterweight 73 resides in a lowered position, the rod 74 via the lever 71 is held in a lowered position and the electrodes 76 will lie on a plane a short distance from the plane of the engagement members 68 and 69.

On the other hand, when the counterweight 73 is raised, the rod 74 effects upward movement of the electrodes 76, resulting in an increase in the distance between the said electrodes and the said engagement members 68, 69.

First and second arms 80, 81 are articulated to the lower branch of the rear support member 62, on the opposite side thereof relative to the connecting rod 64. These arms carry at their lower ends, respective engagement members 82, 83 arranged to engage apertures or holes made on the inside of the two opposite sides of the body S.

The arms 81, 82 are pivotal around respective axes of rotation parallel to the longitudinal direction of the connecting rod 64, between a closely-spaced position in which they can be introduced into the body S through the aperture intended to receive the rear window, and a spreadapart position in which the said arms are arranged to engage respective engagement apertures or holes preformed in the body.

The arms 80, 81 are articulated to the C-shaped rear element 62 by pins 80a, 81a which pass through the lower branch of the said C-shaped element (FIG. 3).

To these pins are affixed a respective positioning lever 84, 85 and a respective control lever 86, 87 (FIG. 3).

In addition, transverse arms 88, 89 are also affixed to the articulating pins of the arms 80, 81 these arms 88, 89 being rotatable in a common plane, and having a length greater than half the distance between the pins 80a, 81a.

A bolt 190 is mounted for vertical movement on the lower arm of the rear C-shaped element 62, in a position equidistant from the pins 80a, 81a. This bolt moves substantially in the plane in which the ends of the transverse arms 88, 89 are rotatable and is so arranged as to be able in its lowered position to wedge in between the ends of the said arms to thereby keep the engagement arms 80,81 in their spread-apart position.

As shown in detail in FIG. 3, two arms 92, 93 are laterally connected to one end of the guide and support structure 33 of the loading station, these arms being substantially L-shaped and lying substantially in the same plane transverse the longitudinal direction of the support and guide structure 33. Fixed to these arms are the bodies of respective hydraulic cylinders 90, 91, disposed with their axes vertical. The shafts 90a, 91a of these cylinders each terminate in a respective forked element 90b, 91b, shaped substantially as an inverted V.

The cylinders 90, 91 act as positioning devices for the body carrier on the guide and support structure 33: when a C- shaped body carrier is pushed onto this structure from the conveyor, the shafts 90a, 91a are in a retracted position. They are thereafter caused to descend and their forked ends 90b and 91b centre the positioning levers 84, 84 of the rear engagement arms 80, 81 of the body carrier. Naturally , the distance between the ends of the forked elements 90b, 91b corresponds to the greatest margin of uncertainty of the position assumed by the body carrier relative to the guide and support structure 33 of the loading station, as a result of the action of the conveyor 1.

The cylinders 90 and 91 thus ensure that each body carrier fed to the loading station will be located and held in a precisely predetermined longitudinal position.

Adjacent to the arms 92, 93 two further arms 94, 95 are connected to the guide and support structure 33 of the loading station, these arms also being shaped as an inverted L and lying substantially in the same plane transverse as the support and guide structure. At their lower ends the said arms mount respective vertical-axis hydraulic cylinders 96, 97 the shafts 96a, 97a of which terminate at their lower ends in respective, substantially C-shaped drive connectors 96b, 97b arranged to cooperate, as will be explained below, with the ends of the control levers 86, 87 of the rear engagement arms 80, 81 of the body carrier.

Adjacent the arms 92, 94 the guide and support structure carries a further arm 98 also shaped as an inverted L. Mounted at one end of the arm 98 is a hydraulic cylinder 99, the shaft 99a of which ends in a forked element 99b arranged, as will be described below, to cooperate with the bolt 190 previously described.

As can be seen from FIG. 2, affixed to the support and guide structure 33 in proximity to the column 31 of the loading station, is a channel-shaped guide element indicated in its entirety as 100, which has an initial ascending section, a horizontal intermediate section, and then a descending section. As will be described below, this channel-shaped guide element is designed to cooperate with the lever 71 pivoted on the front arm 65 of the body carrier and bearing the counterweight 73.

An electronic control and command system of the loading station is indicated in its entirety by reference 101 and is connected, in a manner not shown, to the motor 50 and to the electrovalves which control starting and stopping of the cylinders 90, 91, 96, 97 and 99. This control and command system 101 is further connected, in a manner not shown, to the central unit 12 of the robot transport system for moving the bodies S on the self-propelled trucks 11. More particularly, by means known per se, the control and command system 101 is arranged to supply command signals to the central unit 12 in order to cause the self-propelled truck 11 which is currently positioned below the guide and support structure 33 of the loading station 10, to move by a predetermined amount.

The overhead conveyor plant described operates as follows.

It will be assumed that initially the guide and support structure 33 is in its raised position, in alignment with the conveyor rails 1 and 21, and moreover that no body carrier is present dn the said structure.

The conveyor 1 transports and pushes a body carrier C on to the guide and support structure of the loading station. The free end of the lever 71 bearing the counterweight 73 slips into the ascending section of the channel-shaped guide 100 and as a consequence of its movement up to the central horizontal section is rotated about its point of articulation on the body carrier, against the action of dead weight of the counterweight 73. Following this rotation the contact-carrying rod 75 is moved up to its raised position.

The control and command system 101 activates the cylinders 90, 91 causing the forked positioning elements 90b, 91b to cooperate with the positioning levers 84, 85 of the rear engagement arms of the body carrier to determine the exact longitudinal positioning of the body carrier relative to the loading station. When the body carrier is in its correct position, the free ends of the control levers 86, 87 (FIG. 3) of the rear engagement arms of the body carrier engage the drive connectors 96b, 97b of the cylinders 96 and 97. Moreover, the forked element 99b of the cylinder 99 grasps the bent-over upper end of the bolt 190. The central control and command system 101 thereby effects raising of the said bolt 190 and rotation of the engagement arms 80, 81 in their respective opposite directions of mutual approach.

Once this is complete, the control and command system 101 provides an enabling signal to the central unit 12 of the ground-level transport system: a motorised platform 11 then places a body S of a motor vehicle below the guide and support structure 33 of the loading station 10. This operation completed, the central control and command system 101 activates the motor 50, in the sense to cause the downward movement of the support and guide structure 33. The branches 66, 67 of the front arm 65 of the body carrier enters into the body S brought up by the self-propelled truck 11, through the aperture intended to receive the windscreen; at the same time the rear engagement arms 80, 81 enter into the body S through the aperture intended to receive the rear window.

Lowering of the support and guide structure 33 comes to a halt when the engagement elements 68, 69 of the rear arm of the body carrier are positioned slightly below the cross member 70 of the motor vehicle body with which they are designed to engage (FIG. 4). When this position is reached, the central control and command system 101 outputs a control signal to the central unit of the ground-level transport system. As a result, the central unit 12 causes movement of the truck 11 (and of the body S transported thereby) in the direction of arrow $F_3$ of FIG. 5, such that the engagement members 68, 69 of the front arm 65 of the body carrier become aligned with corresponding apertures preformed in the cross member 70 of the body. This operation completed, the control and command unit 101 again activates the motor 50 to bring about a slight upward movement of the guide and support member 33, enough to cause engagement of the engagement members 68, 69 in the corresponding apertures preformed in the cross member 70 (FIG. 6).

In this condition, the engagement members 82, 83 of the rear engagement arms of the body carrier will be facing the apertures respectively provided for them in the inner side walls of the body S. The central control and command system 101 then causes, by means of the cylinders 96, 97, spreading apart of the rear arms 80, 81 until they are in their engaged positions. The control and command system 101 then activates the cylinder 99, to cause, via the forked element 99b, lowering of the bolt 190 into a position in which it locks the rear arms 80, 81 of the body carrier in their engaged positions.

The motor is then operated by the control and command system 101 to carry the guide and support structure 33 back into its raised position, in alignment with the conveyor rails 1 and 21. As it undergoes this movement, the body carrier C conveys upwards the body S engaged therewith, thereby freeing the self-propelled truck 11 below it.

The conveyor 1 then pushes a new body carrier C towards the loading station 10, thereby moving the body carrier just loaded up, towards the conveyor 21 which takes it off and passes it on to the paint station. When the loaded body carrier leaves the loading station, the end of its lever 71 which bears the counterweight 73 disengages from the profiled guide element 100 and rotates downwards, pushing the shaft 74 downwards, so that the contact members or electrodes 76 will be pressed on to the body S. In this way, the body in its entirety will be electrically connected to the conductor bar 63, which, as explained above, is designed to make sliding contact with an electrified rail, to thereby apply an electric potential to the body S during the actual painting phase. The pressing action of the electrodes on to the body also serves to inhibit disengagement of the front engagement members 68, 69 of the body carrier due to vibrations or swaying or other stresses.

In order to prevent disengagement of the front engagement members 68, 69 of the body carrier from the cross member 70 of the said body when the body carrier and the body are tilted in order to enter the tank or bath of paint, a swinging arm 102 (FIG. 7) can be affixed to the front arm 65 of the body carrier, this arm 102 being arranged when the body carrier is tilted, to engage and lock, with its free end, a transverse rod 103 provided on the shaft 74, as shown in FIG. 7.

Naturally, the principle of the invention remaining the same, the forms of embodiment and details of construction can be widely varied from what has been described and illustrated purely by way of non-restrictive example, without thereby going beyond the scope of this invention.

I claim:

1. A body carrier for an overhead conveyor installation, said body carrier being arranged to carry a motor vehicle body having windshield and rear window apertures and internal engagement apertures, the body carrier comprising:
    at least one trolley,
    a support structure carried by said at least one trolley and arranged to receive and convey a motor vehicle body, said structure having front suspension means and rear suspension means for introduction into said body through said windshield and rear window apertures respectively and for engagement in said internal engagement apertures in the body;
    at least one electrical contact member carried by the said structure and connectible to said body to allow connection of the body to an electric voltage source;
    first locking means for simultaneously locking the said front suspension means and the said at least one electrical contact member respectively in an engaged position and in a position of contact with said body; and
    second locking means for locking the said rear suspension means in an engaged position in the said body.

2. A body carrier according to claim 1, wherein the said front suspension means comprise:
    a substantially-vertical arm the lower end of which divides into two branches,
    a respective engagement member terminating each said branch of the said arm, each said engagement member being arranged to engage in, from below, a respective said engagement aperture formed in an internal cross member of said motor vehicle body, and
    a shaft carrying said at least one electrical contact member, said shaft being mounted for movement along the said arm between a lowered position, in which it is arranged to hold the said at least one electrical contact member against said body and prevent the disengagement of the said engagement members from their corresponding said engagement apertures, and a raised position in which the said at least one electrcial contact member is electrically and mechanically disconnected from said body and allows the disengagement of the said engagement members from the body.

3. A body carrier according to claim 2, wherein the said first locking means comprise a lever system connected at one end to the said movable shaft, and a counterweight connected to the end of said lever system remote from said shaft and arranged to urge said shaft into its said lowered position.

4. A body carrier according to claim 2, further comprising safety locking means arranged to prevent relative displacement between the said arm and shaft of the front suspension means when the body carrier is travelling in a direction inclined to the horizontal.

5. A body carrier according to claim 1, wherein the said rear suspension means comprise first and second arms articulated to the said support structure, and a respective engagement member terminating each said arm and arranged to engage a corresponding said engagement aperture formed in a side member of said motor-vehicle body , said arms being movable between a position of minimum mutual spacing in which they can be introduced into said body, and a spread-apart position in which the said engagement members are arranged to engage their respective engagement apertures in said body.

6. A body carrier according to claim 5, wherein said second locking means comprise a bolt movable relative to the said support structure between a rest position and a working position in which it holds the said arms in their spread-apart position.

7. An overhead conveyor installation for motor-vehicle bodies provided with windshield and rear window apertures and internal engagement apertures, said installation comprising a first overhead conveyor; body carriers in accordance with claim 1, said body carriers being arranged to be conveyed in succession by said first overhead conveyor, a loading station arranged to receive said body carriers from said first overhead conveyor; a robot ground-level transport system comprising a plurality of motorised units each arranged to convey one said motor-vehicle body to the said loading station (10), and a central control for controlling the movements of the said motorised units, the loading station serving to transfer a said body from a said motorised unit to a said body carrier; and a second overhead conveyor arranged to move away from the loading station successive said body carriers after the latter have been loaded up with a respective said body; said loading station comprising:

- a frame,
- a guide and support structure mounted for vertical movement relative to said frame, between a raised position in which the said structure is capable of receiving body carriers from the said first conveyor and at least one lowered position allowing the said suspension means of a said body carrier to be introduced into and engaged with a said body carried on a said motorised unit,
- drive means mounted on said frame and arranged to effect vertical movement of the said guide and support structure,
- positioning means mounted on the said guide and support structure and arranged, when activated, to locate and hold a said body carrier in a predetermined position relative to said guide and support structure,
- control means arranged to deactivate the said first locking means when said body carrier reaches said predetermined position relative to the guide and support structure,
- first and second operating means respectively arranged, when said body carrier is in the said predetermined position, to enable the said rear suspension means to be introduced into and engaged with the said body, and to effect locking of the said rear suspension means in its engaged position using the said second locking means, and
- an electronic control and command system arranged:
  (a) to activate the said positioning means every time a said body carrier arrives at the said guide and support structure,
  (b) thereafter to activate the said first operating means to enable the introduction of the said rear suspension means into a said body,
  (c) to operate the drive means to lower the guide and support structure relative to the frame and introduce the front and rear suspension means of the said body carrier into a said body moved up to the loading station on a said motorised unit,
  (d) to supply command signals to the said central control to cause movement by a predetermined amount, of the motorised unit and of the body carried thereby, relative to the loading station,
  (e) to operate the said drive means to effect raising of said guide and support structure and consequent engagement of the front suspension means with said body, and
  (f) to effect, using the said first and second operating means, engagement of the said rear suspension means with the body and locking of said rear suspension means in its engaged position.

* * * * *